United States Patent
Cappaert et al.

(10) Patent No.: US 8,130,321 B2
(45) Date of Patent: Mar. 6, 2012

(54) METHOD AND A SYSTEM FOR CALIBRATING AN ANALOGUE VIDEO INTERFACE

(75) Inventors: Bart Cappaert, Tielt (BE); Martin Vanbrabant, Wielsbeke (BE)

(73) Assignee: Barco N.V., Kortrijk (BE)

( * ) Notice: Subject to any disclaimer, the term of this patent is extended or adjusted under 35 U.S.C. 154(b) by 1367 days.

(21) Appl. No.: 11/631,855

(22) PCT Filed: Jul. 8, 2005

(86) PCT No.: PCT/EP2005/007541
§ 371 (c)(1),
(2), (4) Date: Jan. 8, 2007

(87) PCT Pub. No.: WO2006/005575
PCT Pub. Date: Jan. 19, 2006

(65) Prior Publication Data
US 2008/0074544 A1    Mar. 27, 2008

(30) Foreign Application Priority Data
Jul. 8, 2004    (EP) .................................... 04076972

(51) Int. Cl.
*H04N 17/00*    (2006.01)
*H04L 7/00*    (2006.01)
*H03M 1/12*    (2006.01)
(52) U.S. Cl. ......................... 348/537; 348/180; 348/572
(58) Field of Classification Search .................. 348/180, 348/572, 510–512, 537; 702/89, 106, 107, 702/117; 715/726
See application file for complete search history.

(56) References Cited

U.S. PATENT DOCUMENTS

| | | | |
|---|---|---|---|
| 4,670,785 A * | 6/1987 | Medin | 348/510 |
| 4,713,691 A * | 12/1987 | Tanaka et al. | 348/537 |
| 4,964,069 A * | 10/1990 | Ely | 715/255 |
| 5,767,916 A | 6/1998 | West | |
| 5,940,136 A | 8/1999 | Abe et al. | |
| 6,522,365 B1 | 2/2003 | Levantovsky et al. | |
| 7,412,654 B1 * | 8/2008 | Cappels et al. | 715/726 |
| 2002/0018038 A1 | 2/2002 | Onishi et al. | |
| 2003/0052871 A1 | 3/2003 | Neal | |
| 2004/0032406 A1 | 2/2004 | Agarwal et al. | |

FOREIGN PATENT DOCUMENTS

| | | |
|---|---|---|
| EP | 0 807 923 A1 | 11/1997 |
| EP | 1 122 710 A2 | 8/2001 |
| WO | WO 97/05740 A1 | 2/1997 |

* cited by examiner

*Primary Examiner* — Victor Kostak
(74) *Attorney, Agent, or Firm* — Bacon & Thomas, PLLC

(57) ABSTRACT

The invention relates to systems and methods for calibrating an analogue video interface. Due to the lack of pixel clock signal (206) information in the video-handling unit, a sample clock signal (202) needs to be generated, which should correspond with the unknown pixel clock signal (206). The types of signals transmitted to the video-handling unit may correspond with strange display formats and no up-front information may be present. The present invention provides methods and systems for automatic calibration of an analogue video interface. These are based on obtaining an analogue video signal (208) that is based on a pixel clock signal (206), generating a sample clock signal (202) having a first frequency by means of a PLL feedback divider having a value, determining a phase-relation between the video signal (208) and the sample clock signal (202) and evaluating the phase-relation to determine if the correct sample clock signal (202) is generated. The method is looped until a correct value for the PLL feedback divider is obtained so as to obtain a correct sample clock signal (202).

19 Claims, 12 Drawing Sheets

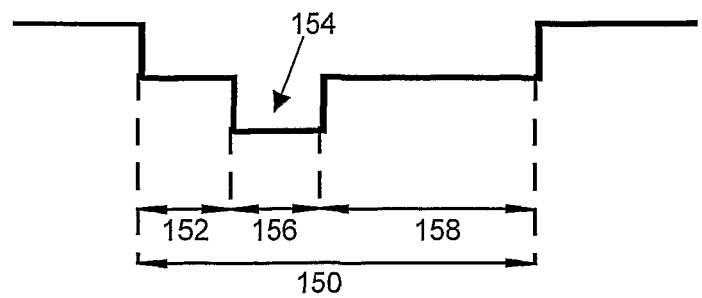
Fig. 1a – prior art
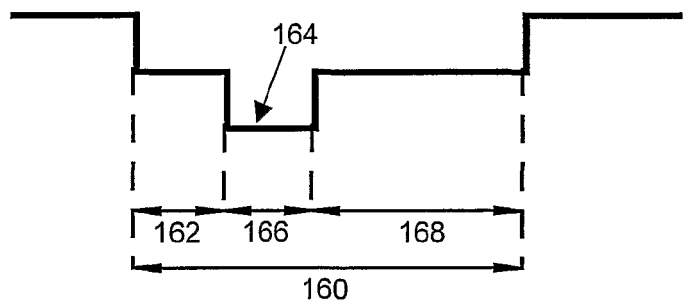
Fig. 1b – prior art
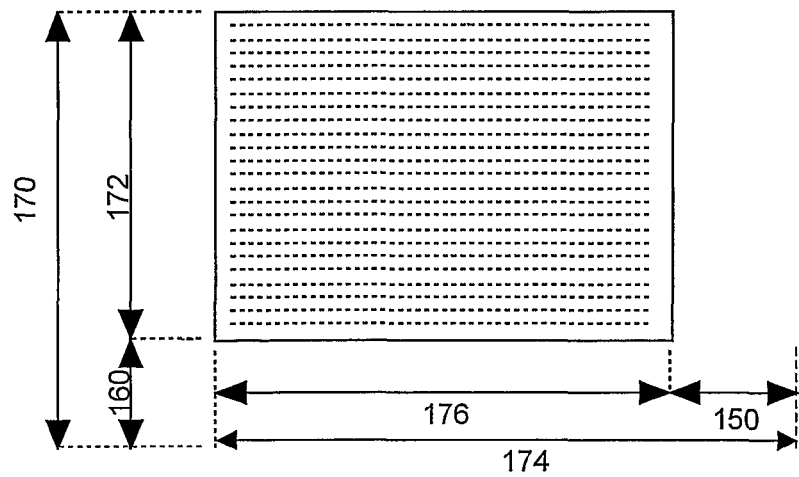
Fig. 1c – prior art

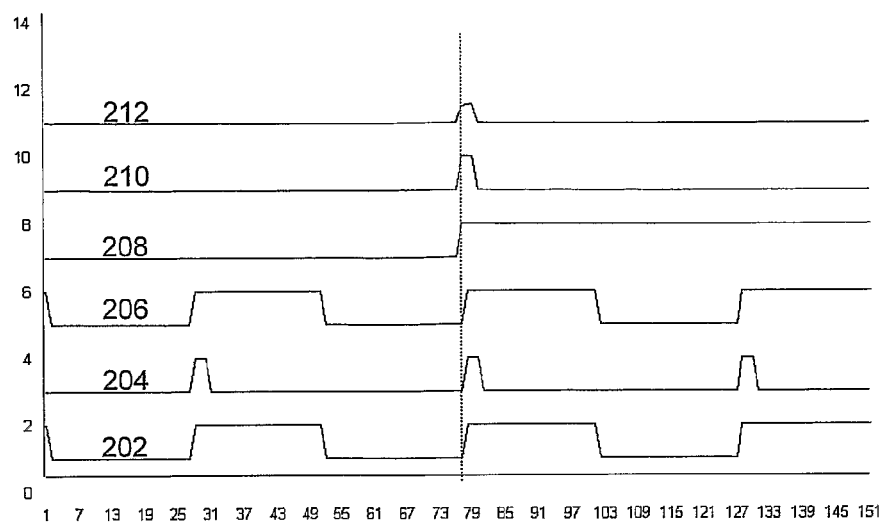
Fig. 2a – prior art
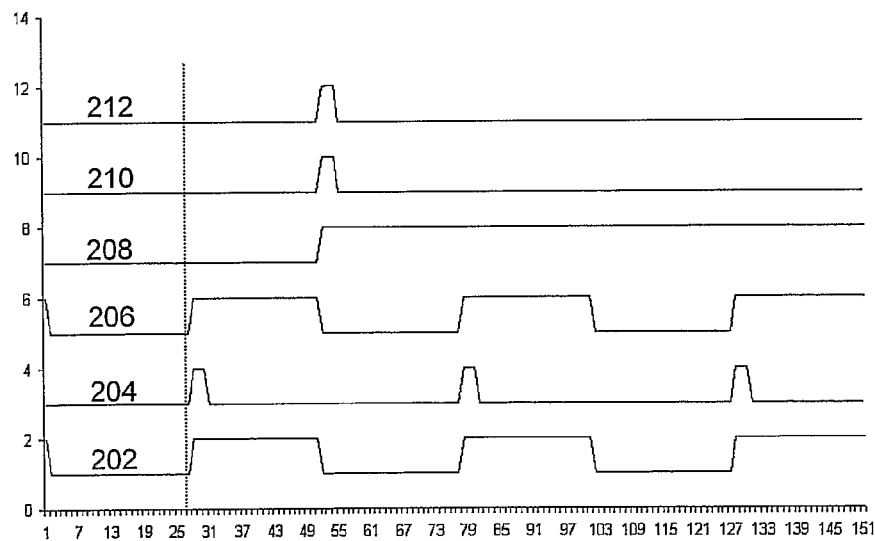
Fig. 2b – prior art

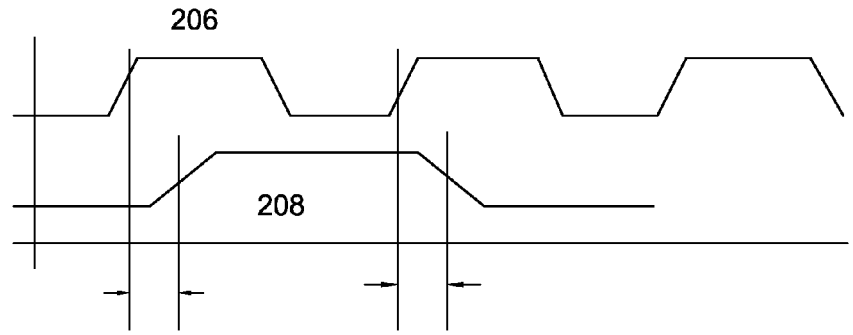
Fig. 2c - prior art
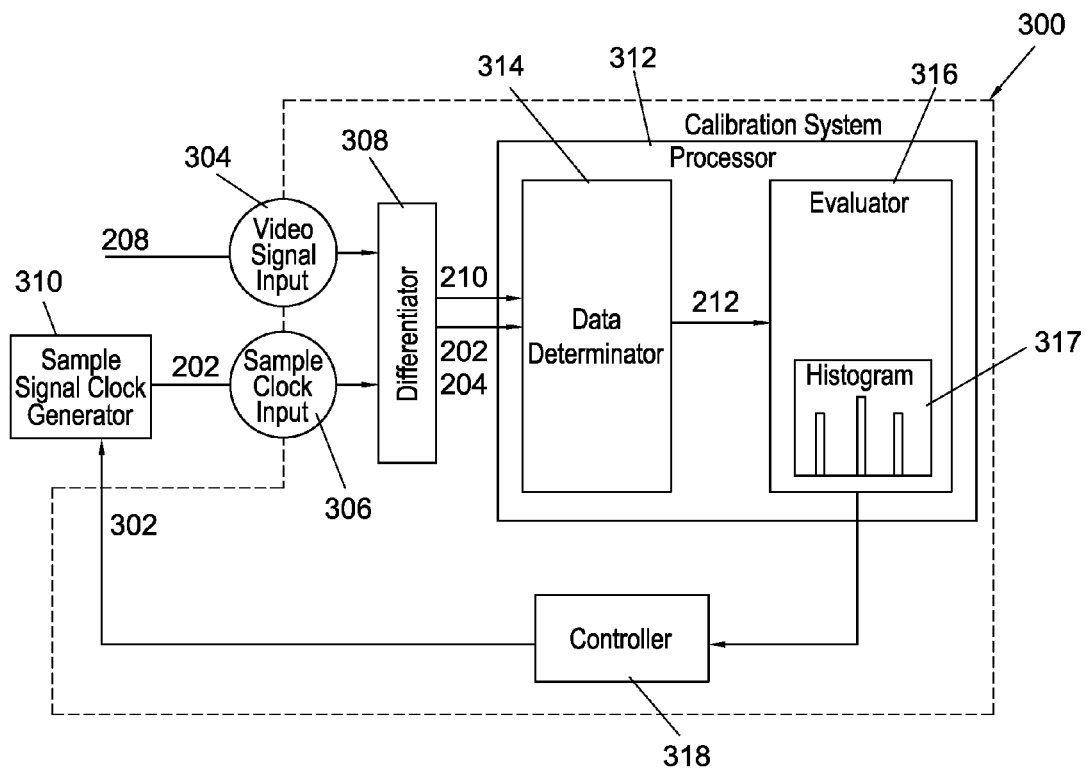
Fig. 3

METHOD AND A SYSTEM FOR CALIBRATING AN ANALOGUE VIDEO INTERFACE

TECHNICAL FIELD OF THE INVENTION

The present invention relates to a method, devices and a system for the processing of analogue video signals. More particularly, the present invention relates to a method, devices and a system for displaying or processing analogue video signals by automatically applying a correct sampling of an incoming analogue video signal without up-front information about the analogue video signal.

BACKGROUND OF THE INVENTION

Despite the increasing importance of digital video interfaces (DVI), analogue video interfaces are still used in fields of the display and video handling systems market. In the host hardware, where the signal is generated, the signal is characterised by a pixel clock signal, which is a signal which divides horizontal lines of video into pixels. The host hardware sends the analogue video signal to the display or video handling unit. Nevertheless, during transmission of the analogue video signal to a display or video handling unit, this pixel clock signal is not transferred with the video signal, such that in the display or video handling unit this information needs to be regenerated in order to allow correct sampling of the video signal, thus allowing correct representation of the corresponding information. Stated in other words, after transmission of an analogue video signal, a signal correctly dividing horizontal lines of video data into pixels needs to be generated. Therefore, a sample clock signal is generated in the display or video handling unit which, in order to correctly display the information in the video signal, needs to correspond with the information in the original pixel clock signal.

Analogue video interfaces typically allow transmission of up to five signals, i.e. e.g. three signals representing the RGB information or signals representing monochrome information and the horizontal and vertical sync information. From this information it is possible to generate a sample clock signal corresponding to the pixel clock signal if the horizontal total number of pixels in the video signal is known, since the frequency of the horizontal sync, a short pulse generated at the beginning of each video line which tells the display device when to start each new line, and which is typically provided by the analogue video interface, equals the pixel clock signal frequency divided by the horizontal total number of pixels. The horizontal total number of pixels is defined as the number of clock-pulses between 2 horizontal sync pulses whereby the clock is used to generate the video output. In other words, if the horizontal total number of pixels is known, knowledge about the horizontal sync allows generation of a sample clock signal corresponding with the original pixel clock signal. Using that information, sampling can be done in a synchronous way. Unfortunately, the information about the horizontal total number of pixels is not transferred by the analogue video interface.

In order to obtain good compatibility between the host hardware and the display or video handling units, several solutions are currently used.

A first solution for obtaining a correct sample clock signal using the horizontal total number of pixels is by manually adjusting the settings while looking at an image on a screen. Many of today's display systems are equipped with an on-screen display (OSD) keypad. Using these tools, an operator can manually adjust the displayed signal until the obtained displayed image is satisfactory. This type of correction can e.g. often be found in monitors for personal computers. A disadvantage of this manual adjustment is that it is not user friendly and that it often is time-consuming. It is difficult to obtain an exact correction easily.

Several of today's display units comprise a Display Data Channel component (DDC) that provides the necessary information to obtain good compatibility between the host hardware and the display unit. Using the DDC component, the information of the total number of pixels that typically can be displayed for a given resolution is provided such that a correct sample clock signal in agreement with the pixel clock signal can be obtained and thus correct sampling can be performed. The DDC component is often used for plug and play systems.

In many of today's systems, the necessary information is obtained based on a look-up table comprising information of several video signal standards as defined by the Video Electronic Standard Association (VESA), also called VESA standards. For these VESA standards, the horizontal total number of pixels is known for the resolution to be displayed. Thus, based on up-front information, the horizontal total number of pixels according to the VESA standards can be provided such that correct sampling occurs.

Another solution to obtain information about the number of pixels is based on the detection of the first and the last pixel of the video content. This solution has as major drawback that the resolution has to be known to extract the number of pixels. Therefore, this method can be used if VESA standard resolutions are detected but the technique suffers from serious problems if the resolution is unknown. If automatic detection is performed, further requirements are introduced for the input image. Furthermore, in the method using the first and the last pixel to obtain the correct total number of pixels, the first and the last pixel need to comprise information. This is not always guaranteed. The latter technique is described in U.S. Pat. No. 5,767,916. The document describes the determination of the total number of pixels based on the knowledge of the horizontal resolution and information about the position of the first and last sampled active pixel in a line. The document furthermore describes the use of phase comparison to obtain equalisation of the phase of the sample and pixel clock signal, not to obtain the correct sample clock signal frequency.

None of the above methods allows a calibration or automatic setting of an analogue video interface for sampling of video signals to be displayed at e.g. unusual or non-standardised resolutions, without up-front prior knowledge of the video signal or the display system to be used.

SUMMARY OF THE INVENTION

It is an object of the present invention to provide calibration of an analogue video interface without the need for up-front—i.e. prior—knowledge about the video signal or the display system.

The above objective is accomplished by a method and device according to the present invention.

In a first aspect, the invention relates to a method for calibrating an analogue video interface, the method comprising obtaining an analogue video signal based on a pixel clock signal, generating a sample clock signal with a first frequency, determining a phase-relation between said obtained video signal and said generated sample clock signal, and evaluating said phase-relation to determine whether the generated sample clock signal has the same frequency as the pixel clock signal, e.g. has indicators of whether said generated sample clock signal has the same frequency as the pixel clock frequency, and if not, generating a different sample clock signal with another frequency and re-executing the determining and evaluating steps. These steps are repeated until the generated sample clock signal is determined to have the same frequency as the pixel clock signal. The calibration may be performed automatically. The obtained analogue video signal may be such that it corresponds with a fixed format image and that the sampling can be done synchronously.

Determining a phase-relation between said obtained video signal and said generated sample clock signal may comprise determining a plurality of video edges in the video signal and sample clock signal edges in the sample clock signal, and for each video edge, determining the phase difference between said video edge and the closest sample clock signal edge.

Determining a plurality of video edges in the video signal may then comprise differentiating the obtained video signal. Determining a phase-relation may comprise the use of a delay chain.

Evaluating said phase-relation may comprise building for said plurality of video edges a histogram of the number of hits as function of said determined phase difference.

Alternatively, determining a phase-relation may comprise selecting a plurality of discrete phase differences from a phase range corresponding with a period of the sample clock signal, said period being determined by said first frequency of said sample clock signal; and for each of said plurality of discrete phase differences, determining over a plurality of periods of said sample clock signal a number of low counts or a number of high counts of the video signal. Said evaluating said phase-relation may comprise building for said plurality of discrete phase differences a histogram of the number of low counts or the number of high counts as a function of the phase difference.

Said determining a phase-relation between said obtained video signal and said generated sample clock signal may comprise, for a plurality of video edges, determining a phase difference between a first video edge and a second video edge, determining a spatial difference between said first video edge and said second video edge, and combining said phase difference and said spatial difference. Combining said phase difference and said spatial difference may comprise determining a ratio of said phase difference and said spatial difference. Said evaluating said phase-relation may comprise building, for said plurality of video edges, a histogram of the number of hits as function of said ratio of said phase difference and said spatial difference.

In a further aspect, the present invention provides a computer program product for executing any of the methods of the present invention when executed on a processing engine such as a microprocessor or a programmable gate array, e.g. an FPGA, associated with an analogue video interface.

The present invention also provides a machine readable data storage device storing the computer program product of the present invention, as well as transmission of the computer product of the present invention over a local or wide area telecommunications network.

In yet another aspect, the invention furthermore relates to a system for calibrating an analogue video interface, the system comprising a means for receiving an analogue video signal based on an unknown pixel clock signal, a means for receiving a sample clock signal, e.g. generated by a sample clock generator, a means for determining a phase-relation between said obtained video signal and said received sample clock signal, a means for evaluating said phase-relation to determine whether the received sample clock signal has the same frequency as the unknown pixel clock signal, and a means for controlling generation of said sample clock signal (202), e.g. by controlling the sample clock signal generator generating said sample clock signal, so as to generate and receive another sample clock signal.

The means for determining a phase-relation may comprise a means for differentiating the video signal and/or the sample clock signal.

The means for determining a phase-relation may comprise a non-clocked delay chain.

The means for evaluating said phase-relation may comprise a means for constructing a histogram of the phase relation. The means for evaluating said phase relation may furthermore comprise a means for evaluating a confidence level for the histogram built.

The system for calibrating may be incorporated in a display unit or in a display processing system.

The invention also relates to a display unit comprising a system for calibrating an analogue video interface according to embodiments of the present invention as described above. The invention furthermore relates to a display processing system comprising a system for calibrating an analogue video interface according to embodiments of the present invention as described above.

In still another aspect, the present invention provides a control unit for an analogue video interface. The control unit comprises a means for receiving an analogue video signal based on an unknown pixel clock signal, a means for receiving a sample clock signal, e.g. generated by a sample clock generator, a means for controlling determination of a phase-relation between said received video signal and said received sample clock signal, a means for controlling evaluation of said phase-relation to determine whether the received sample clock signal has the same frequency as the unknown pixel clock signal, e.g. has indicators of whether said generated sample clock signal has the same frequency as the pixel clock frequency and a means for controlling generation of said sample clock signal, e.g. by controlling a sample clock generator generating said sample clock signal, so as to generate and receive another sample clock signal.

It is an advantage of the present invention that the calibration of the analogue video interface can be obtained substantially independently of the video content of the signal. In other words, it is an advantage of the present invention that the digitising and thus sampling of the video signal can be performed correctly, without restrictions on the image content or with only a few restrictions on the image content, the few restrictions being the corresponding video stream comprising somewhat randomly distributed video edges across the span of the screen.

It is also an advantage of the present invention that the calibration of the analogue video interface can be obtained even for video signals to be displayed at unusual or atypical resolutions.

It is furthermore an advantage of the present invention that the calibration of the analogue video interface allows an easy installation and improved compatibility between the host hardware component and a display unit or a graphic terminal.

It is also an advantage of the present invention that the calibration of the analogue video interface can be provided in a black box type of application that allows providing a video interface between host hardware components and display units or graphic terminals.

It is furthermore also an advantage of the present invention that the digitising and thus sampling of the video signal can be performed correctly, without restrictions on the timing, i.e. without the timing having to be according to a standard.

Furthermore, it is also an advantage that the digitising/sampling of the video signal can be performed without information of the signal up-front.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for calibration of a video interface such that analogue video signals can be displayed or handled correctly and to improved apparatus for displaying/handling video signals comprising a means for automatic calibration of a video interface.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1a to FIG. 1c illustrate different timing parameters for a display interface to sample an analogue video signal, as well known in the prior art.

FIG. 2a is a schematic representation of a bad sample for an analogue video signal, as known in the prior art.

FIG. 2b is a schematic representation of a good sample for an analogue video signal, as known in the prior art.

FIG. 2c is a schematic representation of the timing of a pixel clock signal and a video signal as known in the prior art.

FIG. 3 is a schematic representation of a system for calibrating a video interface according to a first embodiment of the present invention.

Figure 4A:
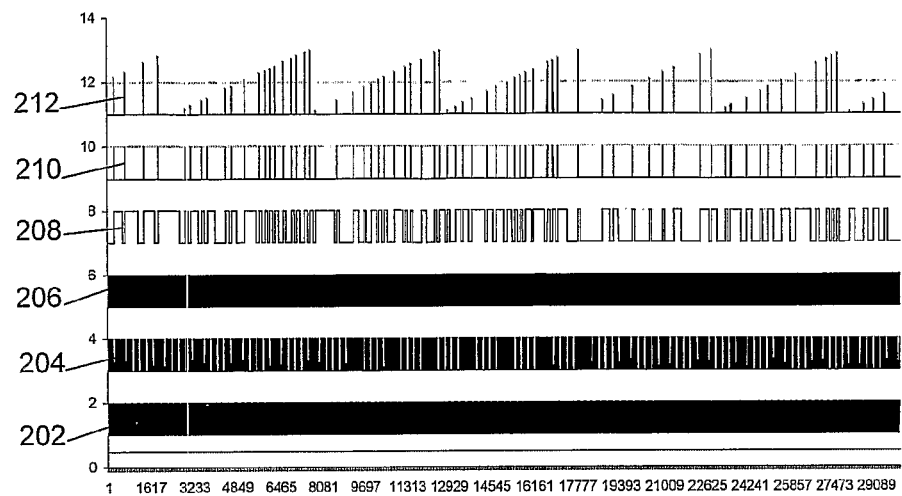
FIG. 4a is a schematic representation of different signals used and obtained in case of an incorrect horizontal total number of pixels in a system for calibrating a video interface according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled", should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The present application relates to defining a good set of timing parameters such that correct sampling of an analogue video signal can be performed and thus correct displaying of the video signal can be obtained. The video signal may correspond with still, partial- or full-motion display images. Several parameters are used to describe the timing in video signal processing. There is an optimal set of parameters for the video interface to sample the video. To be able to select these parameters it is necessary to find the timing information with which the image was built up in the video signal generator/processor. Once the parameters are found, it is easy to set the corresponding optimal settings in the display.

The term "resolution" in the context of display interfaces is often used to refer to the "image format" or "addressibility", i.e. the horizontal and vertical pixel count in a fixed format device. The term "display format" includes not only the image format but also other information required to display the image, e.g. the frame rate, the blanking periods. Each image signal has information relating to the length of the lines of the image as well as information from which it can be decided which parts of the image signals are image pixels to be displayed. A complete video signal, whether analogue or digital, includes information corresponding to the image itself, but also generally has additional "overhead" information. In the situation of an analogue video signal, the "overhead" information is in the blanking period, i.e. that portion of the signal that is intentionally left free of active content, or of information corresponding to a part of the image itself. The requirement for such blanking periods is imposed by the needs of the various imaging and display hardware technologies, which must have some idle time between each scanned line and frame or field in order to reset and prepare for the next. The blanking period almost always contains the signals which provide synchronisation information to the display—those pulses or signals which identify the start of a new line, field or frame. The parameters related to horizontal blanking are illustrated in FIG. 1a.

Horizontal blanking 150, also called line blanking, relates to the interval when the processing has completed a scan line and it must return back to the start of a new line. During this time, no signal processing occurs. The horizontal blanking 150 comprises a front porch 152, which is the black or blanking portion of the composite picture signal lying between the leading edge of the horizontal blanking pulse and the leading edge of the corresponding horizontal sync (synchronisation) pulse 154. The horizontal sync pulses 154, having a width called horizontal sync width 156, are the pulses that control the horizontal scanning of the video devices. The horizontal blanking 150, furthermore comprises a back porch 158, defined as the time in a composite video signal that is between the trailing edge of the sync pule and the trailing edge of the blanking pulse (before the video information). The horizontal blanking 150, thereby is defined as the sum of the front porch 152, the sync width 156 and the back porch 158.

TABLE 1

| | Unity |
|---|---|
| Horizontal or Line Blanking | Pixels |
| Front porch (horizontal) | Pixels |
| Sync Width (horizontal) | Pixels |
| Back porch (horizontal) | Pixels |

In similar way, vertical blanking 160 is illustrated in FIG. 1b together with the vertical front porch 162, the vertical sync pulse 164 having a vertical sync width 166 and a vertical back porch 168, defined in similar way as the horizontal blanking parameters. The vertical blanking 160 thereby is defined as the sum of the vertical front porch 162, the vertical sync width 166 and the vertical back porch 168.

TABLE 2

| | Unity |
|---|---|
| Front porch (vertical) | Lines |
| Sync Width (vertical) | Lines |
| Back porch (vertical) | Lines |
| Vertical or Field Blanking | Lines |

The total number of lines 170 (FIG. 1c) is defined as the sum of the number of active or displayed lines 172 and the vertical blanking 160. In the same way, the horizontal total number of pixels 174 is defined as the number of active pixels 176 and the horizontal blanking 150. These parameters are illustrated in FIG. 1c and shown in table 3.

TABLE 3

| Pixel matrix | Unity |
|---|---|
| Active or displayed number of pixels (horizontal) | Pixels |
| Active or displayed number of lines (vertical) | Lines |
| Total number of lines (vertical) | Lines |
| Total number of pixels (horizontal) | Pixels |

Other parameters that are often used are the refresh rate (not shown), the line or scanning frequency (not shown), defined as the product of the total number of lines 170 and the refresh rate, and the clock frequency (not shown), the clock frequency being defined as the product of the scanning frequency and the horizontal total number of pixels 174. These parameters are shown in table 4. The speed to write or address a pixel (clock frequency) thus is depending upon the horizontal total number of pixels, i.e. the total number of pixels on one line, the total number of lines and the refresh rate.

TABLE 4

| | Unity |
|---|---|
| Refresh rate | Hz |
| Line or Scanning Frequency | KHz |
| Clock Frequency | MHz |

Some of the parameters, such as the refresh rate, the total number of lines 170, the vertical sync width 166 and the horizontal sync width 156 are trivial to measure. If the horizontal total number of pixels 174 can be measured, related parameters can be calculated, except for the image positioning and the resolution. The positioning can be done by detecting the first and last horizontal and the first and last vertical active pixels in the image and positioning the image accordingly. Once the timing parameters have been found, it is easy to set the optimal settings in the display.

The present invention is related to a method and system for determining the horizontal total number of pixels of a video signal, thus allowing to obtain optimum settings and thus calibrating an analogue video interface. Horizontal pixels means the number of pixels in the image to be displayed along a horizontal line in the image assuming the image is displayed the right way up.

In other words, the non-trivial part is the detection of the horizontal total number of pixels 174 without restrictions to the image content nor implying that the timing needs to be standardised nor implying that information about the signal needs to be known up-front. It is common in analogue video signal and timing standards to use the above-described parameters. In the case of digital video systems, there is often no need for e.g. an explicit blanking period, as the information will be placed in a digital storage and/or further processed before being delivered to the display itself. However, many "digital" video systems and standards are based on the assumption that an analogue signal will be "digitised" in order to create the digital data stream, and so include definitions of the blanking period, sync pulse position, etc., in terms of the sample or pixel period. Doing away with such things entirely, and treating the image transmission as if it were any other digital data communication, is generally not done.

The present invention is based on detecting a phase relation between a video signal or the corresponding pixel clock signal, and a generated sample clock signal. It may e.g. be based on detecting a phase difference between a video signal or the corresponding pixel clock signal and a generated sample clock signal or on detecting a phase difference between different video signals, using a generated sample clock signal. For a single video edge, good or bad sampling will depend on the phase difference between the video edge signal and the sample clock signal, as well known by a person skilled in the art. Bad and good sampling of a video edge is illustrated in FIG. 2a and FIG. 2b respectively. Both figures illustrate the different signals determined by the pixel clock signal and the video signal at the one hand and the generated sample clock signal at the other hand. The generated sample clock signal 202 and possibly also the corresponding differentiated sample clock signal 204 are the signals created by the sample clock signal generator in a display unit or video handling unit to allow sampling of an incoming analogue video signal with unknown pixel clock frequency. The pixel clock signal 206, the video signal 208 and the differentiated video signal 210 are signals comprising timing information with witch the image is built up in the video signal generator. The phase difference 212, i.e. the instantaneous phase difference between the sample clock signal 202 and the differentiated video signal 210 or the corresponding video edge present in the video signal 208 is also shown. A sample is taken every rising edge of the sample clock signal 202. If the edge of the video signal 208 occurs at the same time as the rising edge of the sample clock signal 202, as shown in FIG. 2a, the sample is undefined. In that case no good value will be obtained as in some cases the sample will give a high value, while in other cases the sample will give a low value. If, on the other hand, the edge of the video signal 208 occurs at a different moment than the rising edge of the sample clock signal 202, then good sampling occurs because the sample then is taken at a moment where the video signal 208 is stable. This is illustrated in FIG. 2b. The stability of the signal is caused by the generator with as output a DAC signal, i.e. a digital analogue converter signal, having a much higher frequency content than the pixel rate and the rise and fall time of the video signal 208 being much lower than the pixel period, thereby creating a time in which the video signal 208 is stable. This is illustrated in FIG. 2c In some embodiments the present invention uses the phase difference 212 between the rising edge of the sample clock signal 202 and the edge of video signal 208 to determine the horizontal total number of pixels 174, such that a good set of parameters is obtained and good sampling can occur.

In a first aspect, the invention provides a calibration system 300 for an analogue video interface such that correct sampling of an incoming analogue video signal is or can be obtained. The system for calibrating or automatically setting an analogue video interface allows determining of a correct PLL feedback divider value 302—i.e. in agreement with the horizontal total number of pixels 174 of the video signal— used in a display or video handling system such that a correct sample clock signal 202 can be obtained. The horizontal total number of pixels 174 is defined as the number of clock-pulses between two horizontal sync pulses 154 whereby the clock-pulses originate from the pixel clock used to generate the video output. PLL's may be provided in hardware or software—see "Phase-locked loops" R. E. Best, McGraw Hill, fifth edition, 2003, for background reference information to both hardware and software PLL's.

The calibration system 300 of the present invention allows increasing the compatibility between a host hardware component and a display unit or video handling unit. The host hardware component may e.g. be an analogue video recorder, a computer system such as e.g. a personal computer or any other type of analogue video signal transmitting system. The display unit or video handling unit may be any type of unit wherein the video signal is converted to a digital signal, such as e.g. a display, a frame-grabber, a projector, an analogue/ digital converter. The system can be used to provide a good video interface for any hardware component transmitting an analogue video signal 208 to any display unit or video handling unit, provided that the display unit or video handling unit needs to perform an analogue to digital conversion, that the video signal corresponds with a fixed format and that the sampling can be done synchronously. The latter implies that the rise and fall times of the video signal 208 are significantly smaller than the pixel period, or in other words, the rise and fall of the video signal is completed within a pixel period so that the rise and fall can be used as an indicator of a pixel period and not several pixel periods. The rise and fall times preferably are less than half the pixel period. In order to obtain sampling of the incoming video signal 208 in the display unit or video handling unit, a sample clock signal 202 needs to be generated in the display unit or video handling unit in accordance with the pixel clock signal 206 at which the video signal 208 is generated. Nevertheless, the pixel clock signal 206 is not available in the display unit or video handling unit and this timing information needs to be reconstructed using the video signal 208. The latter is done based on an incoming horizontal sync signal, present in the video signal 208, and a PLL feedback divider value 302, defined as the number of sample clock signal cycles between two horizontal sync pulses 154. The sample clock signal generator thus comprises a PLL component with corresponding divider, the PLL feedback divider allowing to generate a specific sample clock signal. Only when the PLL feedback divider value 302 equals the horizontal total number of pixels 174, the generated sample clock signal 202 corresponds with the pixel clock signal 206 and thus correct sampling can be obtained.

A schematic overview of the different components of the calibration system 300 allowing to obtain a good video interface and thus allowing to obtain good sampling, is shown in FIG. 3. The calibration system 300 typically comprises video signal input or input means 304 for receiving an analogue video signal 208 from an external hardware component and sample-clock input or input means 306 for receiving a sample clock signal 202. The calibration system 300 furthermore comprises a differentiator or differentiating means 308 for differentiating the incoming video signal 208 and possibly also for differentiating the sample-clock signal 202. The sample clock signal 202 is generated by a sample clock signal generator 310 which typically is part of the display unit or video handling unit, and which thus does not have to be part of the system 300 for calibrating the video interface. Alternatively, the system 300 for calibrating the video interface may have its own sample clock signal generator and, once calibration has been performed, the necessary information may be provided to a sample clock signal generator of the display unit or video handling unit. It is a purpose of the present invention to determine a correct sample clock signal 202, by using the horizontal sync information present in the video signal 208 and determining the PLL feedback divider value 302 such that it equals the horizontal total number of pixels 174. Initially, the system typically does not possess the correct sample-clock signal 202 (or PLL feedback divider value 302), but using the system 300, the correct sample-clock signal 202 (i.e. the correct PLL feedback divider value 302) can be obtained. The initial sample-clock signal 202 (or PLL feedback divider 302) provided at the beginning of the calibration procedure can be based e.g. on a wild guess or an educated guess or a previous value or a default value, if any partial information, e.g. about the video signal 208, is known upfront. The differentiated video signal 210 and the sample clock signal 202 then is further processed by a processor or processing means 312. It is to be noted that, alternatively, the differentiating means 308 can also be part of the processing means 312. The processing means 312 typically comprises a means for determining a phase-relation between the obtained video signal and the sample clock signal. The means for determining a phase-relation may be a data determinator or means 314 for determining data or values relating to the phase-relation between the differentiated video signal 210 and the sample clock Signal 202 or the differentiated sample clock signal 204. This phase-relation may e.g. be the phase difference 212 between detected video edges of the video signal 208 and sample clock signal edges of the sample clock signal 202. Alternatively or in addition thereto, the means for determining a phase-relation between the obtained video signal and the sample clock signal may be a means for determining a phase difference between different video edges of the obtained video signal, using the sample clock signal and a spatial difference between these different video edges of the obtained video signal. With spatial difference of the video edges, the difference in position of those video edges in the video stream is meant. The means for determining a phase-relation furthermore may comprise means for combining the phase difference and spatial difference between different video edges into a ratio of the phase difference to the spatial difference.

In a first example of the present embodiment, the means 314 for determining data about the phase-relation may comprise e.g. means for creating a delay chain for the differentiated video signal 210. Such a nonclocked delay chain typically creates a delay of maximum 1/20 of the pixel-clock per cell. The means 314 for determining data about the phase-relation furthermore may be adjusted to sample the result of the delay chain with the sample clock signal 202 and to detect video edges in the video signal 208, e.g. by latching the delay chain on the edge of the sample clock signal 202 and detecting the position of the differentiated video pulse 210. Determining of the position of the video edge corresponds with the determination of a cell of the delay chain wherein the differentiated video edge 210 is present. Finally the means 314 for determining data about the phase-relation may be adjusted for determining the phase differences between video edges and the corresponding closest sample clock signal edges. It is to be noted that video edges do not always occur in correspondence with the edges in the pixel clock signal 206, e.g. if no information is present in the differentiated video signal 210 or in the corresponding video signal 208. Therefore it is not guaranteed that for every event of occurrence of a sample clock signal edge a video edge occurs within a reasonable time period. This possible lack of information is solved by evaluating the data about the phase-relation based on statistical results over multiple video edges. The processing means 312 therefore comprises an evaluator or evaluating means 316 for evaluating the data about the phase-relation. This evaluating means 316 may be adjusted to generate a histogram 317 indicating the number of hits per phase for detection over multiple video edges. Optionally, the evaluating means 316 may also provide a means (not represented in FIG. 3) for checking whether the confidence level of the histogram built is significantly high. Furthermore the evaluating means 316 is adapted for analysing the histogram 317. If analysis of the histogram 317 is done for a correct PLL feedback divider value 302, i.e. equaling the horizontal total number of pixels 174, discernible peaks are present in the histogram. This is caused by the fact that the video edge then is independent of the horizontal position. On the other hand if the PLL feedback divider value 302 is incorrect, i.e. if it differs from the horizontal total number of pixels 174, the histogram 317 will give no discernible peaks due to the fact that the hit-position will depend on horizontal position of the edge of the detected video pixel. A random curve somewhat related to the image content will be the result. Thus analysis of the histogram 317 allows to determine whether the correct PLL feedback divider value 302 is used, e.g. by means for detecting particular envelopes, forms or shapes of the values in the histogram which relate to specific states. The calibration system 300 also comprises a controller or controller means 318 for controlling the sample-clock generator 310. The controller means 318 is able to select another PLL feedback divider value 302 for the sample-clock generator 310 such that another sample clock signal 202 is generated if the PLL feedback divider value 302 used in the previous cycle is not correct. The determination of the phase-relation information and the evaluation of the histogram 317 then needs to be redone. The calibration system 300 is used sequentially until a satisfactory PLL feedback divider value 302 is obtained, i.e. until the PLL feedback divider value 302 equals the total horizontal number of pixels 174 as determined from the phase information. The other timing parameters can then be determined and the sampling can be used to further display or handle the video signal. Thus, in the present invention, use is made of some real time statistics to determine the correct horizontal total number of pixels 174 to be used as PLL feedback divider value 302.

The processing means 312 described above may be any type of processing means that allows sufficiently quick processing of the video signals and the corresponding images. The different means part of the processing means 312, i.e. means 314 for determining data about the phase-relation, the evaluation means 316 and possibly the differentiating means 308 may all relate to at least one separate processing component or the functioning of the different means may be grouped and performed in e.g. a single computation component. The processing means 312 may comprise e.g.—but is not limited to—dedicated computation means such as—a programmable logic device, sometimes referred to as PAL, PLA, FPGA, PLD, EPLD, EEPLD, LCA or FPGA. The latter are well-known integrated circuits that provide the advantages of fixed integrated circuits with the flexibility of custom integrated circuits. Such devices allow a user to electrically program standard, off the shelf logic elements to meet a user's specific needs. In particular, such processing engines may be embedded in dedicated circuitry such as a VLSI. Also a digital signal processor (DSP), a general-purpose processor (GPP), an application specific integrated circuit (ASIC), a microprocessor, a microcontroller or a microcomputer can be used. The processing means 312 may for example comprise a field progammable gate array (FPGA) to create a delay chain and determine video edges and may comprise a microprocessor for performing the other tasks like creating and analysing the histogram. The FPGA is a network of reconfigurable hardware with reconfigurable interconnects controlled by a switching matrix and is favourable over e.g. an ASIC as it has a sufficiently larger performance gain for some specific applications.

Figure 4B:
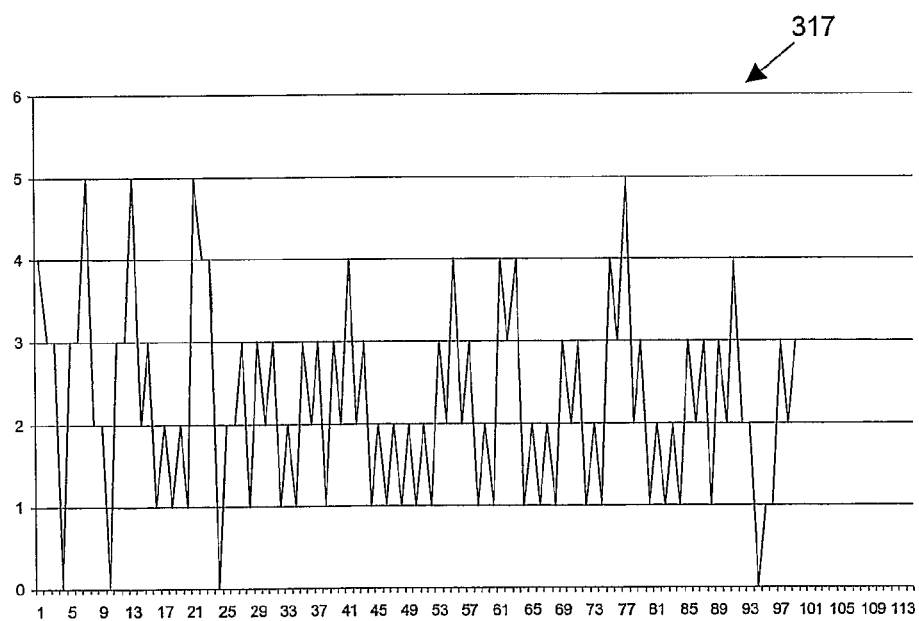
FIG. 4b is a histogram representing the number of hits in function of the phase, for the signals as shown in FIG. 4a, as obtained during calibration of a video interface according to an embodiment of the present invention.
Figure 5A:
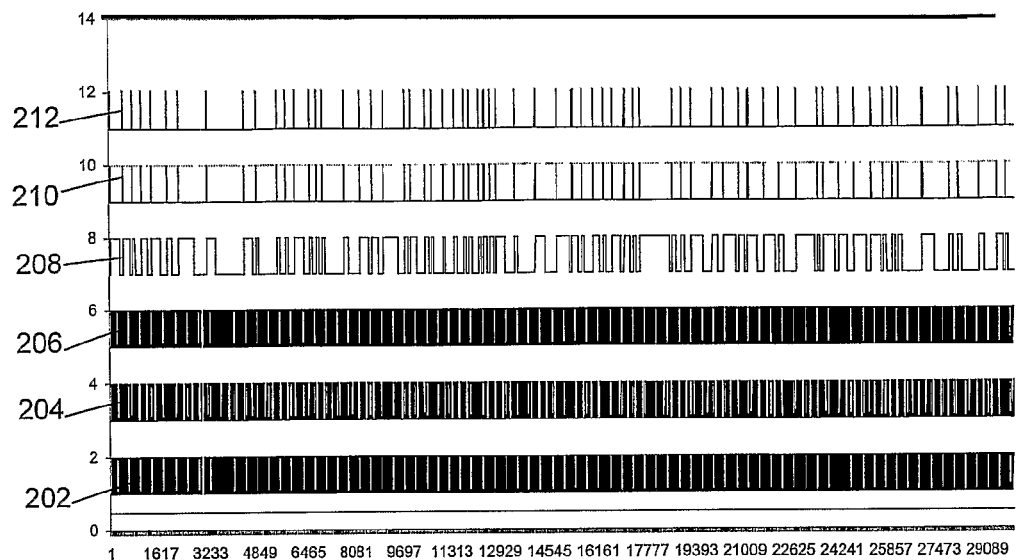
FIG. 5a is a schematic representation of different signals used and obtained in case of a correct horizontal total number of pixels in a system for calibrating a video interface according to an embodiment of the present invention.
Figure 5B:
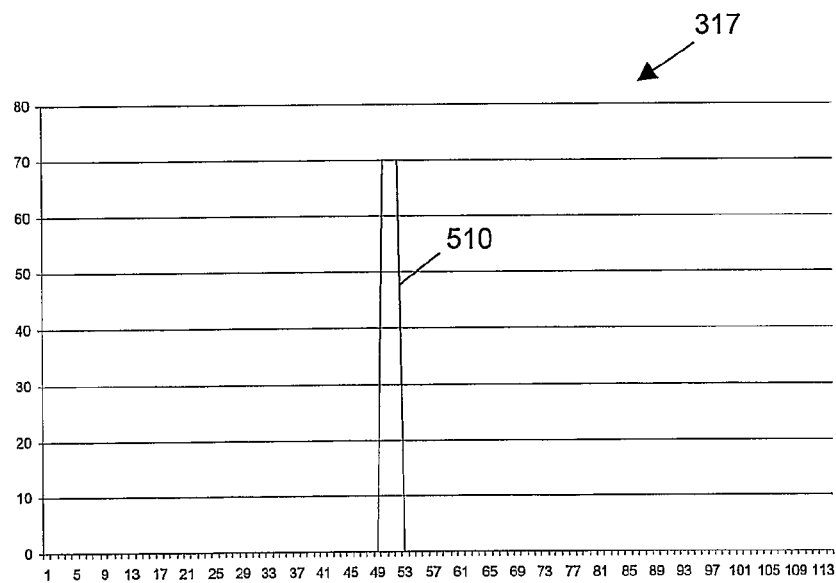
FIG. 5b is a histogram of the number of hits as function of the phase, for the signals as shown in FIG. 5a, as obtained during calibration of a video interface according to an embodiment of the present invention.

By way of example, the generated signals and the corresponding histogram 317 will be shown for a case of bad sampling in FIG. 4a and FIG. 4b and for a case of correct sampling in FIG. 5a and FIG. 5b. FIG. 4a and FIG. 5a illustrate the different signals used in the system 300 for obtaining the calibration or automatic setting. The signals related to the sample clock signal are the sample clock signal 202 itself and the differentiated sample clock signal 204. The signals related to the video signal are the pixel clock signal 206, also called generator clock signal, the video signal 208 that is to be displayed or handled and the differentiated video signal 210. The phase difference between an edge of the sample clock signal 202 and an edge of the video signal 208 is indicated by phase difference 212.

In operation, upon receipt of a video signal 208, an initial value is selected for the PLL feedback divider value 302 which will generate a sample clock signal 202. If the PLL feedback divider value 302 is not set correctly, i.e. when the estimated horizontal total number of pixels which is used as PLL feedback divider value 302 is not exactly the same as the horizontal total number of pixels 174, the phase difference between the video edges related to the pixel-clock signal 206 and the sample clock signal 202 is not constant and depends on the horizontal position, as can be seen by the phase (or phase difference) signal 212 in FIG. 4a. The corresponding histogram 317 shown in FIG. 4b, indicating the number of hits for each phase (or phase difference), then shows a random distribution. The randomness of the hits is caused by the fact that the phase (or phase difference) between the pixel clock signal 206 and the sample clock signal 202 is not constant, but that it depends on the horizontal position, i.e. where on the line the video edge and the sample edge are positioned. Since there are edges on almost all horizontal positions, the histogram 317 shows a random distribution. Based on this histogram 317, e.g. based on a specific characteristic of this histogram such as the absence of significant peaks, it is decided that the PLL feedback divider value 302 differs from the actual horizontal total number of pixels 174. The calibration then needs to be continued by restarting the process with another selected value for the PLL feedback divider value 302, and this process repeated until a better or the correct value is found.

FIG. 5a and FIG. 5b show an overview of the different signals and a corresponding histogram 317 in the case the PLL feedback divider value 302 is equal to the horizontal total number of pixels 174, i.e. if the sample clock signal 202 corresponds with the pixel clock signal 206 and the sampling can be performed correctly. In this case, the phase differences between the video edges related to the pixel clock signal 206 and the sample clock signal 202 is constant. Therefore, the corresponding histogram 317 only shows a single peak, as can be seen in FIG. 5b. Therefore a histogram 317 indicating a discernible peak 510 indicates that the PLL feedback divider value 302 equals the horizontal total number of pixels 174. In this case the phase difference is not depending on the horizontal position and there will be either only good sampling or only bad sampling on the complete video signal, depending on the exact value of the phase difference between the pixel clock signal 206 and the sample clock signal 202. By shifting in time, a phase difference between the pixel clock signal 206 and the sample clock signal 202 can be found such that there is always a phase setting where only good sampling occurs.

There is also possibility of image content to alias with the difference in total horizontal number of pixels. If, for example, the image content contains 6 vertical lines equally spread over the horizontal active pixels there will be a false accept when the selected number of pixels is 6. The alias components may become visible by creating a different histogram. The chance on errors is reduced if there is knowledge about the aliasing image content or if a test image is used or if a noisy signal is used or if sufficient time elapses for pseudo-random image content to be assumed.

In the above, an explicit example was given of determination of the data about the phase-relation using a delay chain. This allows direct determination of the phase difference for every video edge. A simpler solution, nevertheless leading to a slower implementation but also an embodiment of the invention, can be obtained if the phase-relation determination means 314 do not provide a means for creating a delay chain, but provide a phase sweep to obtain the necessary information. In this example, the video signal 208 is differentiated so as to form a differentiated video signal 210 and is directly clocked by the sample clock signal 202 to be checked for correctness. Sampling is done for a plurality of periods of the sample clock signal 202 and at events corresponding with a fixed phase difference, i.e. corresponding with a fraction of the sample clock signal period. The number of high values or the number of low values for the differentiated video signal 210 are counted for that fixed phase difference. In other words, a fixed fraction of the sample clock signal period is chosen and the differentiated video signal 210 is studied every moment corresponding with the moment being a fixed fraction of the sample clock signal period after the sample clock signal edges. The counting for high and/or low values is done for a fixed number of clock edges. This can be accomplished by counting the differentiated pulses with another accumulator or by selecting an integer number of frames. The result is added to a histogram 317 indicating the number of low values and/or the number or high values as a function of the phase difference. Subsequently, another phase difference is selected, i.e. another fraction of the sample clock signal period is selected, and the counting of high and/or low values in the differentiated video signal 210 is retaken. The latter is repeated until a histogram 317 of counts versus the possible phase value is obtained. In other words, the possible phase value or phase difference value is swept over the complete range of phase differences corresponding with a complete period of the sample clock signal 202 and the number of low values or high values is set out/recorded. If a sudden change in the histogram 317 is seen this indicates that a correct PLL feedback divider value 302 is obtained and thus sampling of the video signal 208 can be done based on the obtained results. If this is not the case, a different value for the PLL feedback divider value 302 is chosen and the process is repeated. So the present embodiment is a simpler implementation as no delay chain is needed but this embodiment has the disadvantage of being relatively slow as instead of only scanning over different possibilities for the horizontal total number of pixels 174 also scanning over different phases or phase differences is needed. In principle, the whole phase range, corresponding with a complete period of the sample clock signal 202, will be scanned. Therefore typically a number of discrete phase differences are selected to be studied. These typically are equally spaced over the complete range of phase differences. A typical maximum spreading between two selected neighbouring discrete phase differences corresponds with $1/20^{th}$ of the sample clock signal period. As no delay chain is needed, the determination means 314 for determining the phase-relation information can be a less complicated processing component. Furthermore, other examples are also possible, whereby e.g. a combination is made of using a delay chain for splitting the differentiated video signal 210 and of using a sweeping phase for determining the number of high/low counts based on the delay chain information.

In a further alternative example, the determined phase-relation is, for a plurality of video edges, a phase difference and a spatial difference between different video edges of a same video stream, sampled using the generated sample clock. The means used therefore may be the same as the means provided in any of the above-described examples. The phase difference may be determined indirectly, based on the phase difference between video edges and sample clock, or directly as a phase difference between video edges. The means furthermore allow to determine positions of video edges and differences between these positions. The means also may allow to generate a histogram indicating the number of hits as a function of the ratio of the phase difference to the spatial difference. A peak in the ratio of the phase difference to the spatial difference indicates an estimate of the relative error between the selected PLL feedback divider and the actual number of pixels. The latter may be derived from evaluating the phase step per "1 pixel spatial difference" and the previously selected feedback divider, as the phase difference integrated over a single line is known and is linear over the complete line.

Figure 6:
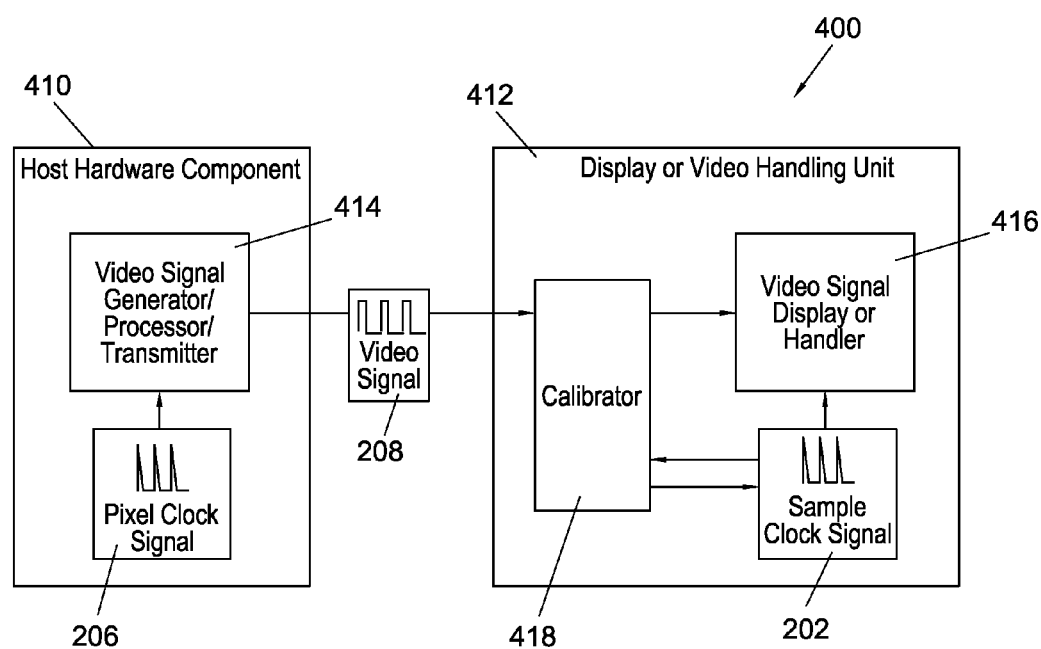
FIG. 6 is a schematic representation of a video source connected to a display or video handling system wherein the signal can be sampled according to a second embodiment of the present invention.

According to a second embodiment the system for calibration of an analogue video interface may, be incorporated directly in the display unit. The invention typically is used in a system 400 as shown in FIG. 6, comprising on the one hand a host hardware component 410, which may e.g. be a video recorder, a computer system such as for example a PC or any other type of analogue video signal transmitting system and comprising on the other hand a display unit or video handling unit 412, which may be any type of unit wherein the video signal is handled, such as e.g. a display, a frame-grabber, a projector, an analogue/digital converter or any other suitable device. The host hardware component 410 typically comprises a video signal generator/processor/transmitter or generating/processing/transmitting means 414 timed by a pixel clock signal 206. It transmits a video signal 208, which typically is an RGB signal with information about the horizontal and vertical sync, but can be any other suitable signal containing suitable information. The video signal 208 is transferred to the display unit or video handling unit 412, which typically comprises a video signal display or handler or a means 416 for displaying or handling the video signal, controlled by a sample clock signal 202 for sampling the video signal 208. The system furthermore comprises a calibrator or a means for calibrating 418 an analogue video interface performing the functions of the means for calibrating an analogue video interface as described in the first embodiment and shown in e.g. FIG. 3. A more detailed illustration is given in FIG. 7.

Figure 7:
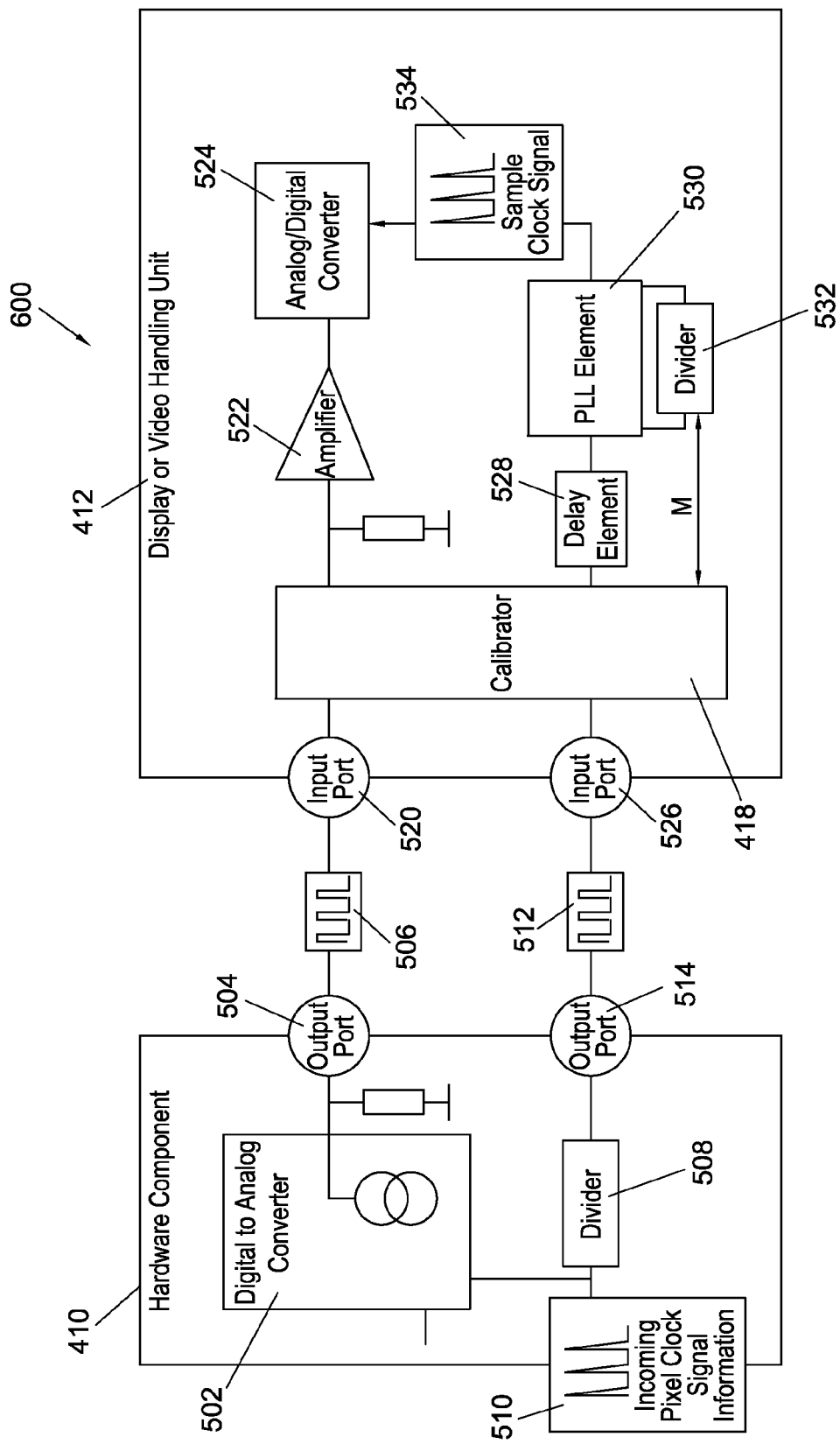
FIG. 7 is a more detailed schematic representation of a video source connected to a display or video handling system wherein the signal can be sampled according to the second embodiment of the present invention.

The calibration system 600 as shown in FIG. 7 comprises a hardware component 410 and a display unit or video processing unit 412. The hardware component 410 typically comprises, amongst others, a digital to analogue converter 502 for transmitting video pixel information 506 such as e.g. an RGB signal through a first output port 504, and a divider 508 to convert incoming pixel clock signal information 510 to horizontal sync information 512 which will be transmitted through a second output port 514. The horizontal sync information 512 is typically used for synchronisation of the video signal in the display or video handling unit 412. The divider 508 divides the pixel clock signal by the horizontal total number of pixels 174. The display unit or video handling unit 412 comprises a first input port 520 for receiving the video pixel information 506 which is directed to an amplifier 522 and processed in an analogue digital converter 524. The horizontal sync information 512 is obtained via a second input port 526 where it is directed to a delay element 528 and subsequently to a phase locked loop (PLL) element 530 comprising a divider 532. The generated sample clock signal 534 is then provided to the analogue/digital converter 524 and the video signal is processed. The value M used in the divider 532 is set by the means for calibrating 418 the analogue video interface which has the same features and functions as in the system 400 for calibrating the analogue video interface described in the previous embodiment.

Figure 8:
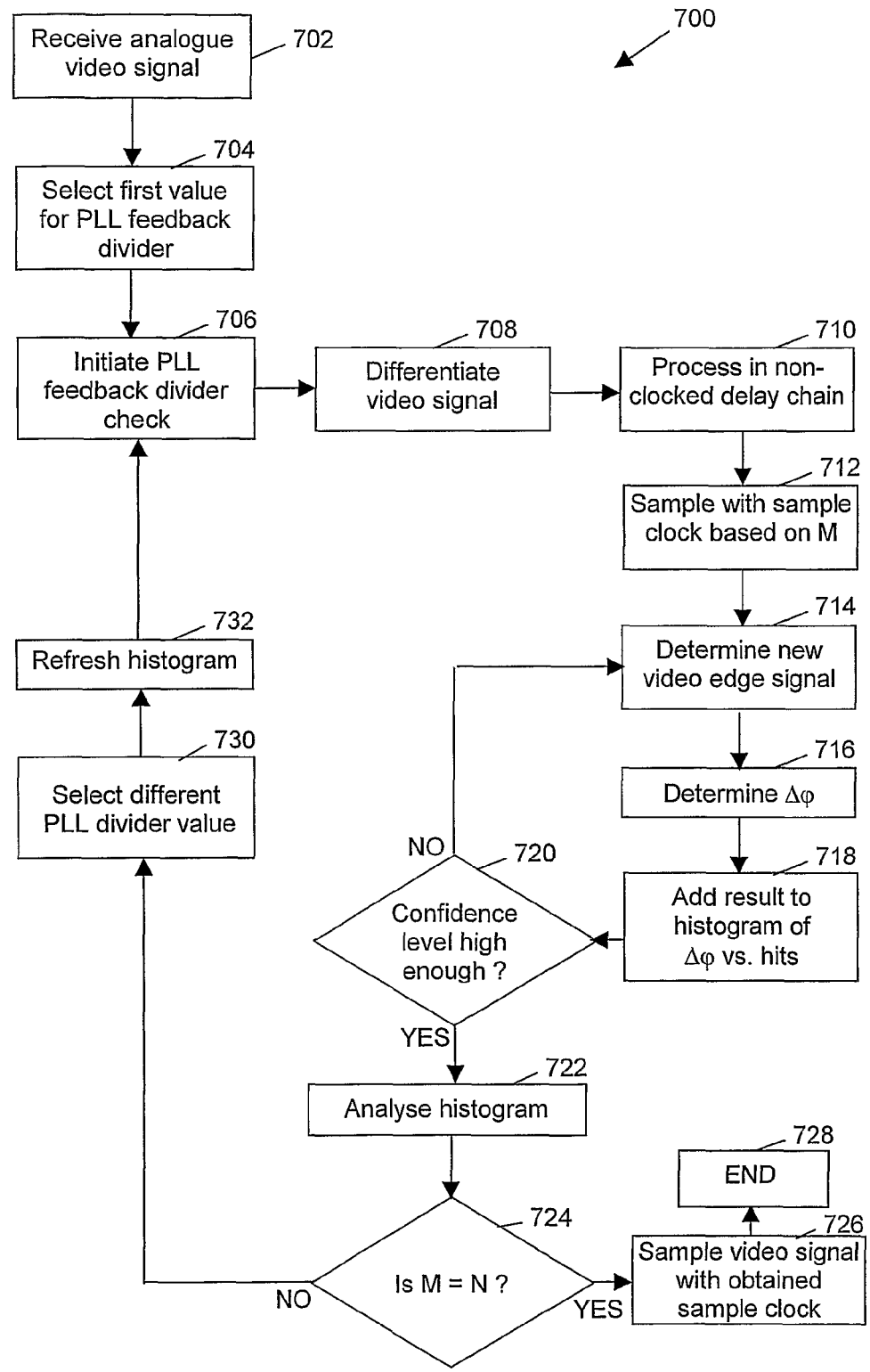
FIG. 8 is a flow chart of a method for calibrating a video interface according to an embodiment of the present invention.

The invention furthermore relates to a second aspect, describing a calibration method for calibrating an analogue video interface such that correct sampling of a video signal can be obtained. A flow chart diagram of method 700 is shown in FIG. 8. Method 700 typically is applied to systems whereby no prior knowledge is available about the analogue video signal standard and using display units or video processing units having substantially only information channels for the RGB values and for the vertical and horizontal syncs. In other words, method 70 is for being applied to display units or video processing units whereby no information about the settings for sampling of the video signal is known. Typically such display units or video processing units do not have VESA timing display possibilities or are able to not use the VESA timing display possibilities. Such display units or video processing units typically do not have or do not use a way of providing information about the time signal used during creation of the video signal. Furthermore, no information about the relation between the timing of the signal in these units and the digital clock is provided. Nevertheless, the method is not limited to application to these systems only. The method can be applied to obtain a good video interface for any hardware component transmitting an analogue video signal 208 to any display unit or video handling unit, provided that the display unit or video handling unit needs to perform an analogue to digital conversion, that the video signal corresponds with a fixed format and that the sampling can be done synchronously. The latter implies that the rise and fall times of the video signal are significantly smaller than the pixel period. As upper limit, the rise and fall times need to be less than half the pixel period. The method can e.g. be performed using any of the calibration means described in the previous embodiments.

The calibration method 700 for obtaining a good video interface, i.e. for determining the correct timing parameters for sampling is mainly related to the determination of the horizontal total number of pixels 174 as the other time related parameters can easily be found once the horizontal total number of pixels 174 is known. If the PLL feedback divider value 302, which determines the frequency of the sample clock signal 202, is set equal to the horizontal total number of pixels 174, a correct sample clock signal 202 is obtained allowing correct sampling of the video signal 208.

The calibration method 700 for the analogue video interface typically is initiated when a display unit or video processing unit is connected to a host hardware system for transmission of an analogue video signal to the display unit or video processing unit.

In a first step 702, the system 400 as described in the first embodiment of the first aspect of the present invention, which may be a separate system functioning as a black box in between a video signal generating system and a display or video processing unit, or the system 600 as described in the second embodiment which is part of the display or video handling system, receives an analogue video signal 208 with unknown timing information for the video signal 208. The analogue video signal 208 typically comprises 5 information channels, e.g. 3 signals corresponding with the RGB info, a horizontal sync signal and a vertical sync signal.

In a second step 704, the PLL feedback divider value is set to a first value M, which may be an initial guess based on additional information such as e.g. information about the resolution of the display unit or video processing unit, or it may be a random value or wild guess within the possible range of horizontal total number of pixels of a display unit or video processing unit. Based on this value M, a sample clock signal is generated corresponding with the specific PLL feedback divider value M.

In step 706, the process is initiated for checking whether the used value M for the PLL feedback divider is correct, i.e. whether the PLL feedback divider value M is equal to the horizontal total number of pixels 174 or in other words whether the generated sample clock signal 202 corresponds to the pixel clock signal 206.

In step 708 the video signal 208 is differentiated thereby creating a differentiated video signal 210.

The differentiated video signal 210 is then, in step 710, processed in a non-clocked delay chain, whereby a timeline is created measuring time on sub-pixel level. Such a non-clocked delay chain typically creates a delay of maximum 1/20 of the pixel-clock per cell. The processing may be done in any suitable processing component, such as e.g. any of an PAL, PLA, FPGA, PLD, EPLD, EEPLD, LCA or FPGA, a microcomputer, a microcontroller or a DSP, GPP or ASIC.

In step 712, the result of the chain is sampled with a clock related to the sample clock signal 202. The frequency of the sample clock signal 202 at this moment is determined by the first PLL feedback divider value M.

Subsequently the position of a video edge is detected, i.e. step 714. This can be done by determining the cell of the delay chain wherein the differentiated video edge pulse is present.

In step 716, the phase difference between the signal related to the sample clock signal and the video edge is determined. In this way, actually the phase difference between the sample clock signal and the pixel clock signal can be studied. The latter cannot be done directly, as the pixel clock signal is not known at the display unit or video handling unit. As the presence of a video edge is not guaranteed for every sample clock signal, the method needs to make use of real statistics.

In step 718, the result is added to a histogram indicating the number of hits for each specific phase difference.

In decision step 720 it is decided whether the confidence level of the histogram is already sufficiently large. The confidence level of the histogram can be determined based on standard statistical tests, as known by the person skilled in the art. If the confidence level is large enough, the histogram is analysed further. The latter step is optional and can e.g. be performed only when already a large number of video edges have been analysed. A typical number of video edges that may be analysed prior to checking the confidence level is in the order of 20000. If the confidence level is not high enough, or the minimum number before checking the confidence level is not reached yet, the method returns to step 714 do determine a further video edge. If checking the confidence level is not performed, the number of video edges necessary may be predetermined and returning to step 714 may be done until the predetermined number of results is added to the histogram.

In step 722 an analysis of the histogram is performed resulting in decision step 724. If the histogram shows a large peak for a specific phase difference $\Delta\phi$ the PLL feedback divider has the correct value, i.e. the PLL feedback divider value M equals the horizontal total number of pixels 174. The generated sample clock signal 202 then corresponds with the pixel clock signal 206 with which the video signal 208 is generated or processed and thus transmitted to the display unit or video processing unit. The sample clock signal can be used to sample the video signal correctly as indicated in step 726 and the method ends in step 728. While analyzing the histogram, it is possible that no clear decision can be made due to partial aliasing in the image-content. In this case, peaks and ground noise may be present in the histogram due to the image content, i.e. not related to the PLL feedback divider value. It then is decided to measure more or even to measure without the aliasing component present. Since the aliasing components are concentrated around certain horizontal positions, these positions can be eliminated during calibration such that a less disturbed histogram can be obtained.

If the histogram shows a more random-like distribution, the PLL feedback divider does not have the correct value, i.e. M does not equal the horizontal total number of pixels 174. The method then proceeds to steps 730 wherein another, different, value for the PLL feedback divider value is selected.

The selection of the PLL feedback divider value may be done in a specific way. In principle, the initial guess will be based on any available information about the display unit or may be a commonly used PLL feedback divider value based on e.g. a VESA standard. If this is not the correct PLL feedback divider, other guesses for the PLL feedback divider value need to be done. Typically, these guesses are made in a small range comprising the initial guess, as there is a relatively high change that there is only a small deviation from e.g. VESA standard values. If the correct PLL feedback divider value is not in this range, the correct value may be found by scanning the complete range of possible values for the PLL feedback divider.

In step 732, the histogram is refreshed. This step may also be performed directly after a negative decision in the decision step 724. The method then returns to step 706 where the new value for the PLL feedback divider can be checked for correctness in a subsequent cycle. The method is continued until a good value for the PLL feedback divider is obtained and thus correct sampling is possible.

In an alternative embodiment, another calibration method 800 for obtaining a correctly functioning analogue video interface is described. The method partially comprises the same steps as the method 700 described in the previous embodiment, but the differentiated video signal 210 is immediately sampled by the sample clock signal 202 and the phase related information is obtained by performing a phase sweep. Therefore, the method comprises the same steps as in the previous embodiment, except for steps 710-722. The method instead comprises the following steps:

In step 810, sampling the differentiated video signal 210 is performed using the sample clock signal 202 corresponding with the current value M for the PLL feedback divider.

In step 812 a specific phase difference $\Delta\phi_0$ is selected; If already a phase difference was selected for the present PLL feedback divider value, the currently selected phase difference is chosen different from previously selected phase difference(s). In other words, a specific phase difference $\Delta\phi_0$ that has not yet been studied for the present PLL feedback divider is selected. The phase difference is selected from the range corresponding with the period of the sample clock signal In step 814, the number of high values and/or the number of low values for the differentiated video signal 210 are counted at those positions of the video signal having a phase difference with the sample clock signal edge equal to the selected phase difference $\Delta\phi_0$. The counting for high and/or low values is done for a fixed number of clock edges. This can be accomplished by counting the differentiated pulses with another accumulator or by selecting an integer number of frames.

In step 818 the result of the counting is added to a histogram indicating the number of high and/or low values as a function of the phase difference.

In decision step 820 it is checked whether this process has been done for each specific phase difference $\Delta\phi_0$ of a whole phase sweep. If counting has not been done for all phase differences yet, the method 800 returns to step 812 wherein a new value for the phase difference is determined. The latter is repeated until a complete phase sweep is done.

In step 822 the evaluation of the histogram is performed. For the present method, evaluation is based on whether a sudden step in the histogram occurs. If a sudden step occurs, the PLL feedback divider value currently used is the correct one and sampling can be performed based on this information. If no sudden step occurs, another value for the feedback divider needs to be chosen and the process of checking the PLL feedback divider needs to be repeated. The method then proceeds to step 730.

In a fifth embodiment of the present invention, a further calibration method for obtaining a correctly functioning analogue video interface is described. The further calibration method of the present embodiment is similar to any of the calibration methods as described in the previous method embodiments, but additional steps are provided in order to allow selecting a more appropriate estimate of the number of pixels, i.e. in case the selected PLL feedback divider value 302—or corresponding therewith the estimated number of pixels—is not correct. Preferably, the selected PLL feedback divider value 302 differs not more than the correct number of pixels. The method comprises deriving information related to a phase difference between different video edges and related to a spatial difference in position of these video edges, for a plurality of video edges. With "spatial difference in position", the difference in position of the video edges in the video stream is meant. The video edges used may be consecutive video edges or may be non-consecutive video edges. Deriving information about a phase difference between a set of different video edges may e.g. be performed by deriving a first phase difference between a first video edge and a sample clock signal, deriving a second phase difference between a second video edge and a sample clock signal, and deriving therefrom a phase difference between the first and the second video edge. Alternatively, the phase difference between a first and a second video edge may be obtained by directly measuring the phase difference between the two video edges, e.g. using a delay line. It is to be noted that a relative long delay line may be needed therefor. The spatial difference in position of these video edges may e.g. be obtained by determining the position of the first video edge, determining the position of the second video edge and determining the spatial difference between these two positions. Evaluating the information related to a phase difference between different Video edges and related to a spatial difference, i.e. a difference in position, of these video edges, for a plurality of video edges, allows to obtain an indication of the error made in the selected PLL feedback divider value 302. The latter can be understood as follows. If the correct PLL feedback divider value 302 would be selected, the generated sample clock would correspond with the video data, resulting in a fixed phase difference between the generated sample clock signal and the video data and in the absence of a phase difference between different edges of video data. If an incorrect PLL feedback divider value 302 is selected, the change in phase difference between different edges of video data is a measure for the quantification of the error on the PLL feedback divider value 302. An estimate of a more appropriate PLL feedback divider value, i.e. a more appropriate number of pixels, may be derived from the phase step per "1 pixel spatial difference", i.e. the phase step for neighbouring video edges, and the previously selected feedback divider, as the phase difference integrated over a single line is known and is linear over the complete line.

The information about a phase difference between different video edges and about a spatial difference in position of these video edges, for a plurality of video edges, may be in the form of a distribution of the derivative of the phase with respect to the horizontal position of the video edges. The peak in such a distribution indicates a quantification of the error of the feedback divider. The information can be obtained in the form of a histogram, referred to as the second histogram, although the invention is not limited thereto.

Figure 9:
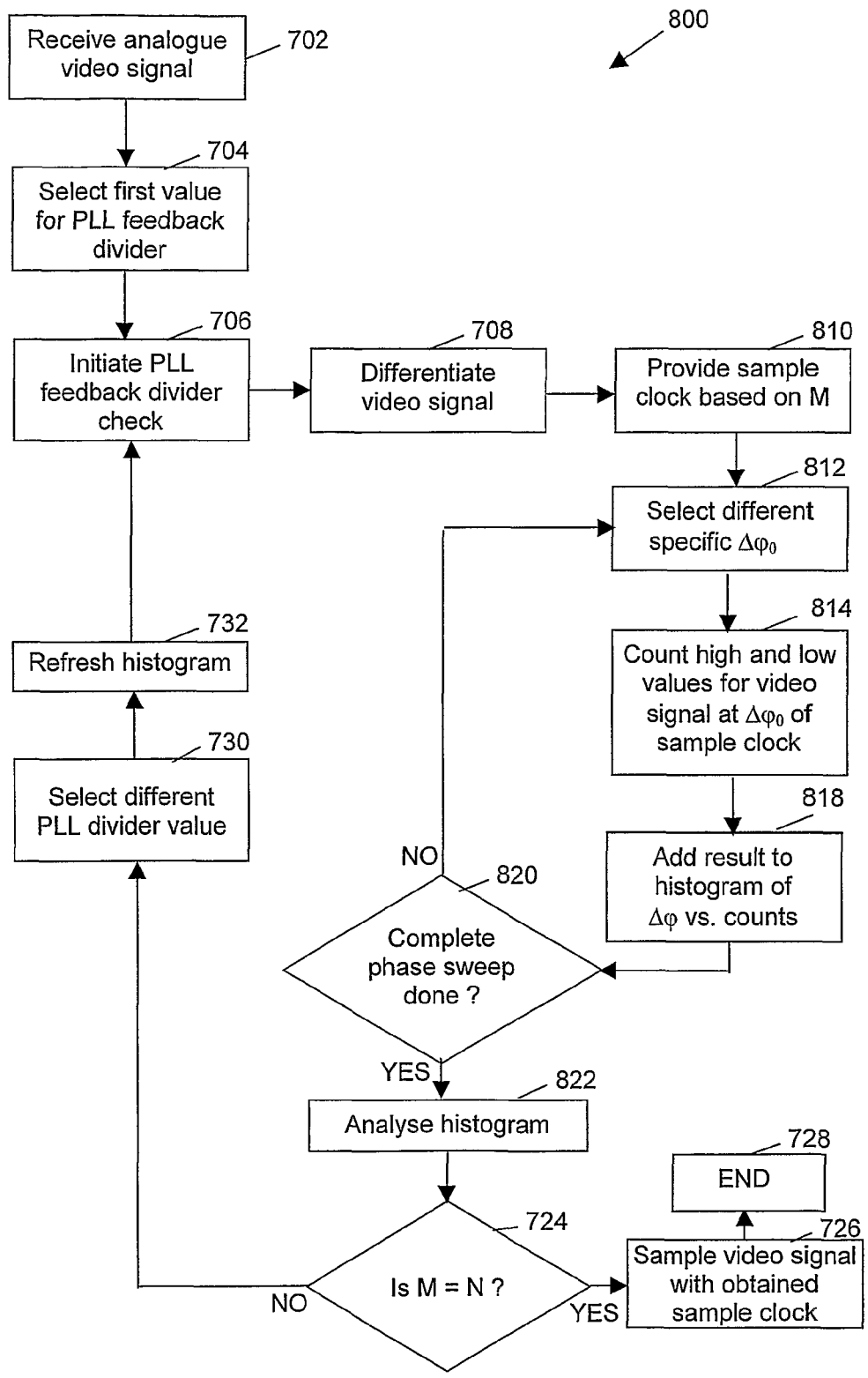
FIG. 9 is a flow chart of another method for calibrating a video interface according to a further embodiment of the present invention.
Figure 10:
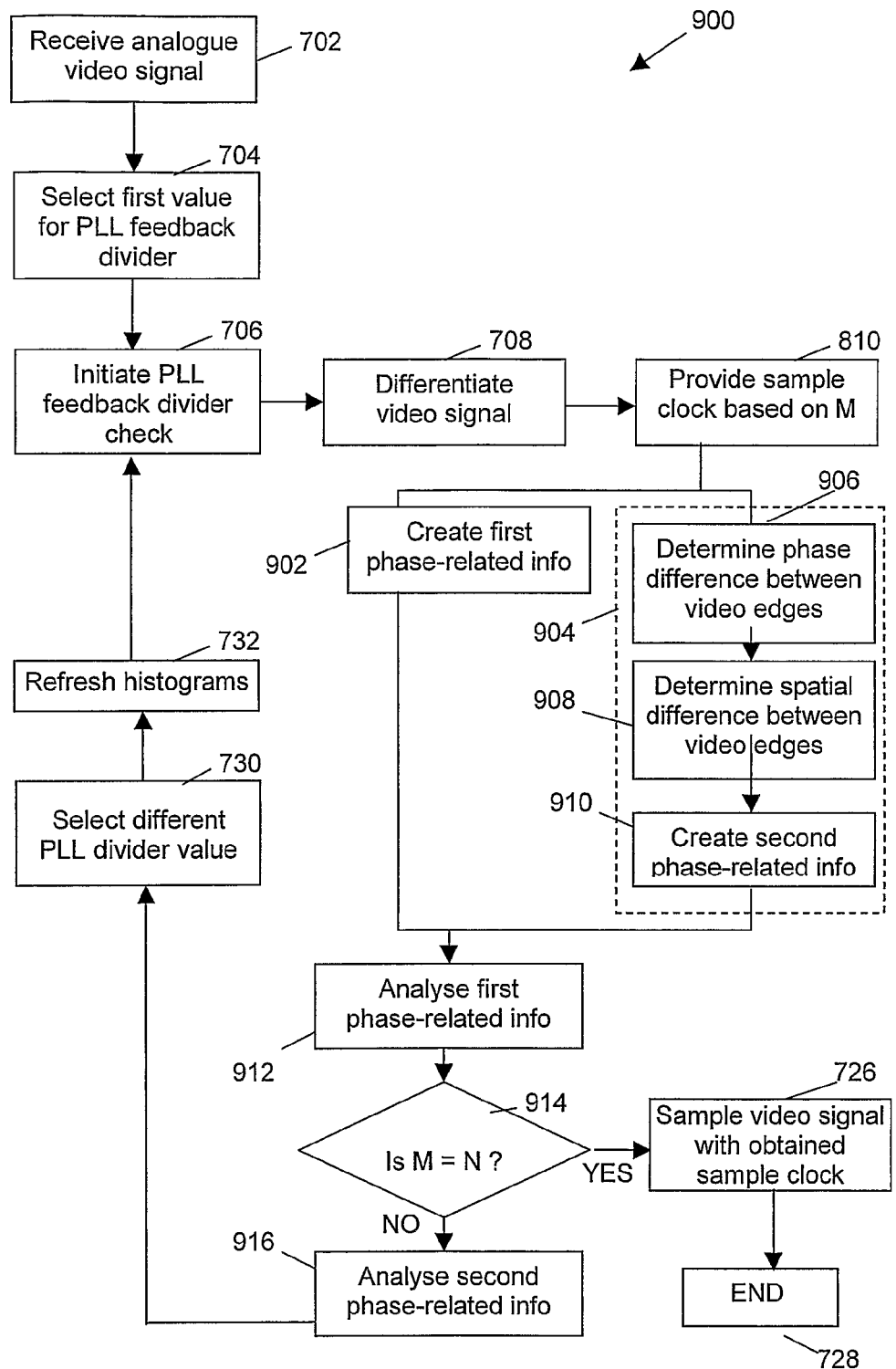
FIG. 10 is a flow chart of a further method for calibrating a video interface according to a further embodiment of the present invention.

An illustrative example of how to perform a calibration method using information about a phase difference between different video edges and about a spatial difference in position of these video edges is provided in FIG. 10. The method 900 comprises the same steps as described in the previous method embodiments and shown in FIG. 8 or FIG. 9, but it comprises the additional step of using the positions of different video edge signals to determine spatial differences between video edges and determining the phase difference between different video edges. Creation of the phase-relation as described in the previous method embodiments, indicated in FIG. 8 by steps 714 to 720 and in FIG. 9 by steps 812 to 820, is more generally indicated in FIG. 10 by creating a first phase-relation in step 902, whereas obtaining information about a phase difference between different video edges and about a spatial difference in position of these video edges is indicated in steps 906 to steps 910, grouped as creating a second phase-relation in step 904. If the selected PLL feedback divider value is equal to the number of pixels, which is evaluated in step 914, the selected PLL feedback divider value corresponds to the number of pixels and the video signal is sampled with the obtained sample clock, i.e. step 726 is performed. If the selected PLL feedback divider value is not equal to the number of pixels, an analysis of the second phase-relation is performed, in step 916, allowing to estimate a more appropriate selected PLL feedback divider value in step 730.

An example of a practical implementation of creating second phase-relation, i.e. step 904, may be as follows. Every time an edge is detected, the horizontal position and the detected phase may be registered in a register. The difference in horizontal position between different video edges is determined, i.e. step 906. The latter may be done for data about video edges stored in a register, for calculated data or for data related to spatial information obtained in any other suitable way. A check may be performed whether the determined difference in horizontal position between different video edges is not too big. If the difference in horizontal position of the video edges used is too big, the chance of wrap around errors, i.e. errors made because the phase difference is larger than 360°, is substantially larger than when the spatial distance is small. Such wrap around is seen in the histogram as noise added to the signal. It preferably is avoided by discarding data related to a large difference in horizontal position of the video edges in the video stream. Discarded large differences may e.g. be differences of more than 100 sample clock periods or more than 50 sample clock periods.

In step 908, for the video edges with known spatial difference in position, the phase difference is obtained. The latter can be done by using phase related data about the respective video edges which is e.g. stored in a register, calculated or determined in any other suitable way. It may be checked that the result is not too big, in order to avoid wrap around errors. In step 910, further phase related information is derived from the spatial difference and the phase difference between the video edges. This information may be the ratio of the phase difference to the spatial difference. The latter can be done for a large number of video edges, which may be consecutive or non-consecutive. The results may be grouped in a histogram. An analysis of the phase related information provides an indication of the error made in the estimate of the number of pixels, which may be derived from the phase step per "1 pixel spatial difference" and the selected PLL divider value. In this way a diagram may be obtained wherein the highest peak indicates an estimate of the error made between the selected PLL divider value and the real PLL divider value.

Figure 11A:
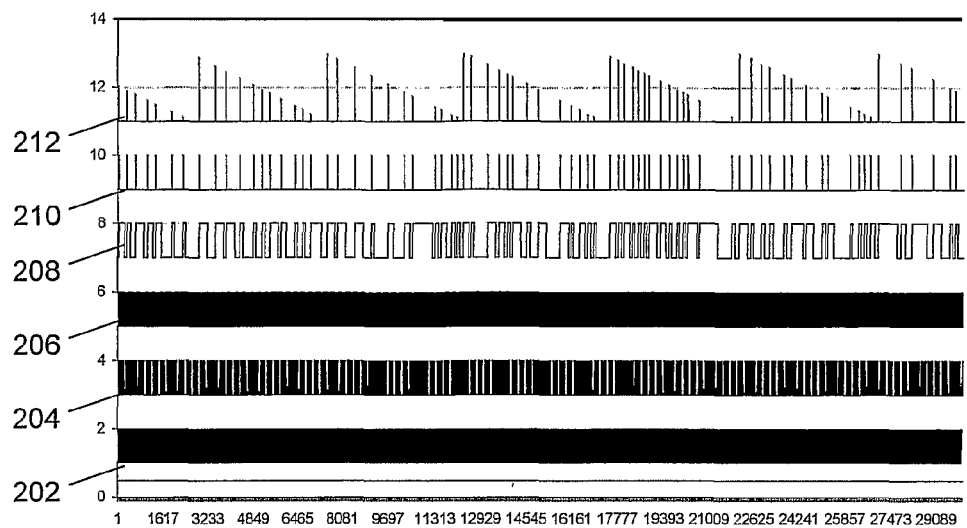
FIG. 11a is a schematic representation of different signals used and obtained in case of an incorrect horizontal total number of pixels in a system for calibrating a video interface according to an embodiment of the present invention.
Figure 11B:
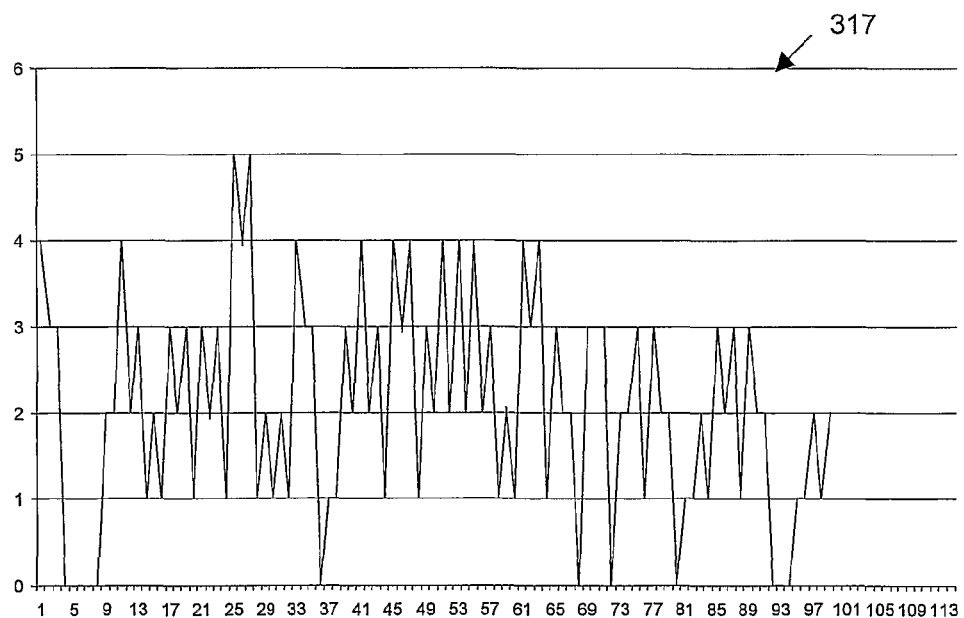
FIG. 11b is a first histogram representing the number of hits as a function of the phase, for the signals as shown in FIG. 11a, as obtained during calibration of a video interface according to a further embodiment of the present invention.
Figure 11C:
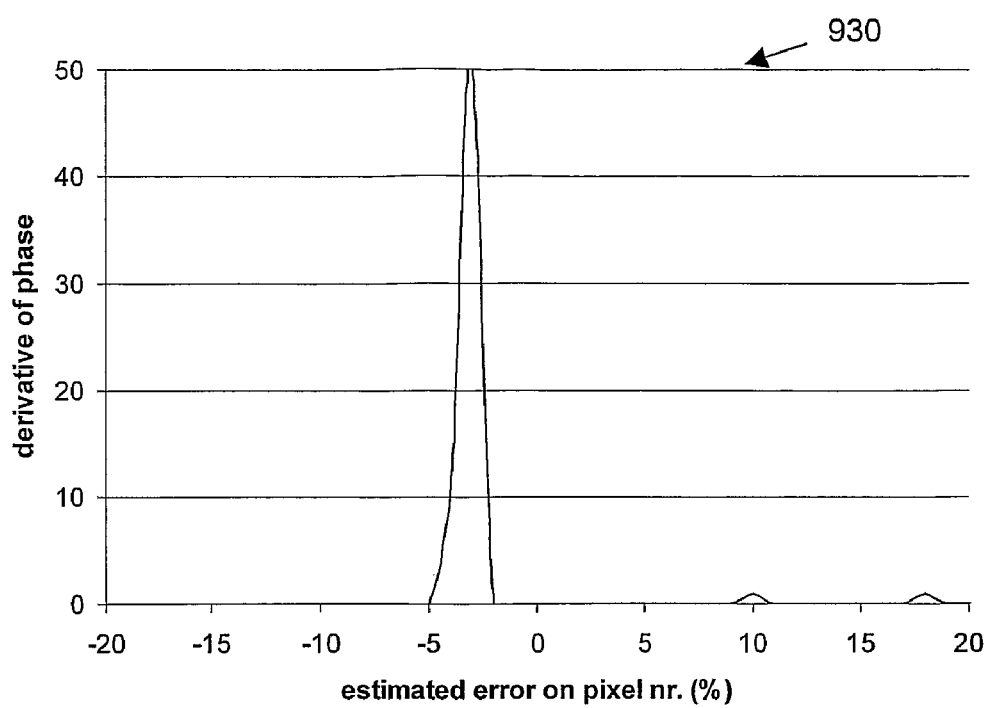
FIG. 11c is a second histogram representing the derivative of the phase as a function of an estimated correction number of the number of pixels, according to a further embodiment of the present invention.

An illustration of results obtained in a method according to the present invention is given in FIG. 11a, FIG. 11b and FIG. 11c. FIG. 11a shows a schematic representation of different signals in case of an incorrectly selected PLL feedback divider value 302, i.e. not corresponding with the actual horizontal total number of pixels 174 of the video signal, in a system for calibrating a video interface. The different signals shown are the generated sample clock signal 202, the corresponding differentiated sample clock signal 204. The pixel clock signal 206, the video signal 208 and the differentiated video signal 210 are signals comprising timing information with witch the image is built up in the video signal generator. The phase difference 212, i.e. the instantaneous phase difference between the sample clock signal 202 and the differentiated video signal 210 or the corresponding video edge present in the video signal 208 is also shown. These signals are similar to those described in the previous method embodiments.

A first histogram 317, shown in FIG. 11b, indicating the number of hits as a function of the phase, is obtained as described in any of the method embodiments described above. The calibration method of the present invention furthermore comprises obtaining further phase related information 930 comprising a second histogram, shown in FIG. 11c, in the present example indicating the derivative of the phase to the horizontal position as a function of an estimated relative error for the selected number of pixels. This information may allow to perform a more accurate guess of the number of pixels, i.e. of the PLL feedback divider value to be used.

It is an advantage of the present embodiment that a high efficiency can be obtained as it allows converging relatively fast to the correct PLL feedback divider value. The latter is obtained as a better guess of the PLL feedback divider value can be performed, guided by the results of the phase-relation based on a phase difference and spatial difference between video edges. The efficiency of the method of the present embodiment may be a factor 10 to 20 higher than the efficiency of methods of the previous embodiments.

The present invention uses the fact that the video signal contains information about the frequency of the pixel clock signal. The pixel clock signal therefore may be unknown in the display unit or video handling unit. The rise and fall positions of the video signal are at a certain fixed time DAC (Digital Analog converter) delay away from the rise and fall times of the pixel-clock. Since video edges are not always present on every position, this information cannot be used directly and therefore the above described methods and systems are based on real statistics carried out over multiple video edges.

Other arrangements for accomplishing the objectives of the method and systems for calibrating an analogue video interface embodying the invention will be obvious for those skilled in the art. It is to be understood that although preferred embodiments, specific constructions and configurations, as well as materials, have been discussed herein for devices according to the present invention, various changes or modifications in form and detail may be made without departing from the scope and spirit of this invention. For example, whereas the systems described refer only to the calibration of an analogue video interface, the system also may be used for updating a database of video standards present in a hardware component or a display system, as to improve compatibility with other systems that are e.g. new on the market. The system then comprises an additional means for storing information in a database of video standards present in the hardware component or the display system. Another example relates to a method for calibrating an analogue video interface by combining the method of using a delay chain for splitting the differentiated video signal and using a phase sweep for determining the number of high/low counts based on the delay chain information.

The invention claimed is:

1. A method for calibrating an analog video interface, the method comprising
   obtaining an analog video signal based on a pixel clock signal,
   generating a sample clock signal with a first frequency,
   determining a phase-relation between said obtained video signal and said generated sample clock signal, and
   evaluating said phase-relation to determine whether the generated sample clock signal has indicators of whether said generated sample clock signal has the same frequency as the pixel clock signal, and if not, generating a different sample clock signal with another frequency and re-executing the determining and evaluating steps,
   wherein said determining a phase-relation between said obtained video signal and said generated sample clock signal comprises
      determining a plurality of video edges in the video signal and sample clock signal edges in the sample clock signal, and
      for each video edge, determining the phase difference between said video edge and the closest sample clock signal edge.

2. The method for calibrating according to claim 1, wherein determining a plurality of video edges in the video signal comprises differentiating the obtained video signal.

3. The method for calibrating according to claim 1, wherein said determining a phase-relation comprises the use of a delay chain.

4. The method for calibrating according to claim 1, wherein said evaluating said phase-relation comprises
   building for said plurality of video edges a histogram of the number of hits as function of said determined phase difference.

5. A method for calibrating an analog video interface, the method comprising
   obtaining an analog video signal based on a pixel clock signal,
   generating a sample clock signal with a first frequency,
   determining a phase-relation between said obtained video signal and said generated sample clock signal, and
   evaluating said phase-relation to determine whether the generated sample clock signal has indicators of whether said generated sample clock signal has the same frequency as the pixel clock signal, and if not, generating a different sample clock signal with another frequency and re-executing the determining and evaluating steps,
   wherein said determining a phase-relation comprises
      selecting a plurality of discrete phase differences from a phase range corresponding with a period of the sample clock signal, said period being determined by said first frequency of said sample clock signal; and
      for each of said plurality of discrete phase differences, determining over a plurality of periods of said sample clock signal a number of low counts or a number of high counts of the video signal.

6. The method for calibrating according to claim 5, wherein said evaluating said phase-relation comprises
   building for said plurality of discrete phase differences a histogram of the number of low counts or the number of high counts as a function of the phase difference.

7. A method for calibrating an analogue video interface, the method comprising
  obtaining an analog video signal based on a pixel clock signal,
  generating a sample clock signal with a first frequency,
  determining a phase-relation between said obtained video signal and said generated sample clock signal, and
  evaluating said phase-relation to determine whether the generated sample clock signal has indicators of whether said generated sample clock signal has the same frequency as the pixel clock signal, and if not, generating a different sample clock signal with another frequency and re-executing the determining and evaluating steps
  wherein said determining a phase-relation between said obtained video signal and said generated sample clock signal comprises, for a plurality of video edges,
    determining a phase difference between a first video edge and a second video edge
    determining a spatial difference between said first video edge and said second video edge
    combining said phase difference and said spatial difference.

8. The method for calibrating according to claim 7, wherein combining said phase difference and said spatial difference comprises determining a ratio of said phase difference and said spatial difference.

9. The method for calibrating according to claim 8, wherein said evaluating said phase-relation comprises building, for said plurality of video edges, a histogram of the number of hits as function of said ratio of said phase difference and said spatial difference.

10. A machine-readable data storage device storing a computer program product for executing any of the methods as claimed in claim 1 when executed on a computing device associated with an analog video interface.

11. A system for calibrating an analog video interface, the system comprising
  an analog video signal input based on an unknown pixel clock signal,
  a sample clock signal input,
  a determinator of a phase-relation between said obtained video signal and said received sample clock signal,
  an evaluator of said phase-relation to determine whether the received sample clock signal has indicators that said generated sample clock signal has the same frequency as the unknown pixel clock signal, and
  a controller to control generation of said sample clock signal so as to receive another sample clock signal,
  wherein said evaluator of said phase-relation comprises a means for constructing a histogram of the phase-relation.

12. The system for calibrating according to claim 11, wherein the phase-relation determinator comprises a differentiator to differentiate the video signal and/or the sample clock signal.

13. The system for calibrating according to claim 11, wherein said phase-relation determinator comprises a non-clocked delay chain.

14. The system for calibrating according to claim 11, wherein said evaluator of said phase-relation furthermore comprises a means for evaluating a confidence level for the histogram built.

15. A display unit comprising a system for calibrating an analog video interface according to claim 11.

16. A display processing system comprising a system for calibrating an analog video interface according to claim 11.

17. A control unit for an analog video interface, the control unit comprising:
  an analogue video signal input based on an unknown pixel clock signal,
  a sample clock signal input,
  determinator of a phase-relation between said obtained video signal and said received sample clock signal,
  an evaluator of said phase-relation to determine whether the received sample clock signal has indicators that said received sample clock signal has the same frequency as the unknown pixel clock signal, and
  a controller to control generation of said sample clock signal so as to receive another sample clock signal,
  wherein the evaluator of said phase-relation comprises a means for constructing a histogram of the phase-relation.

18. A control unit for an analog video interface, the control unit comprising:
  an analog video signal input based on an unknown pixel clock signal,
  a sample clock signal input,
  a determinator of a phase-relation between said obtained video signal and said received sample clock signal,
  an evaluator of said phase-relation to determine whether the received sample clock signal has indicators that said received sample clock signal has the same frequency as the unknown pixel clock signal, and
  a controller to control generation of said sample clock signal so as to receive another sample clock signal,
  wherein the evaluator of said phase-relation furthermore comprises a means for evaluating a confidence level for the histogram built.

19. A system for calibrating an analog video interface, the system comprising
  an analog video signal input based on an unknown pixel clock signal,
  a sample clock signal input,
  a determinator of a phase-relation between said obtained video signal and said received sample clock signal,
  an evaluator of said phase-relation to determine whether the received sample clock signal has indicators that said generated sample clock signal has the same frequency as the unknown pixel clock signal, and
  a controller to control generation of said sample clock signal so as to receive another sample clock signal,
  wherein said evaluator of said phase-relation furthermore comprises a means for evaluating a confidence level for the histogram built.

* * * * *